(12) United States Patent
Qiao et al.

(10) Patent No.: US 11,860,394 B1
(45) Date of Patent: Jan. 2, 2024

(54) ELECTRONIC DEVICES WITH REDUCED STRAY LIGHT AND AMBIENT LIGHT REFLECTIONS

(71) Applicant: Apple Inc., Cupertino, CA (US)

(72) Inventors: Yi Qiao, San Jose, CA (US); Jean-Pierre S. Guillou, Los Gatos, CA (US); Michael J. Brown, Campbell, CA (US); Paul C. Kelley, San Francisco, CA (US); Tyler R. Kakuda, Stockton, CA (US); Ying-Chih Wang, Sunnyvale, CA (US); Salman Karbasi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 483 days.

(21) Appl. No.: 16/935,021

(22) Filed: Jul. 21, 2020

Related U.S. Application Data

(60) Provisional application No. 62/905,542, filed on Sep. 25, 2019.

(51) Int. Cl.
*G02B 6/06* (2006.01)
*F21V 8/00* (2006.01)
*G02B 1/14* (2015.01)
*G02B 5/00* (2006.01)
*G02B 6/42* (2006.01)

(52) U.S. Cl.
CPC ............ *G02B 6/0008* (2013.01); *G02B 1/14* (2015.01); *G02B 5/003* (2013.01); *G02B 6/4202* (2013.01)

(58) Field of Classification Search
None
See application file for complete search history.

(56) References Cited

U.S. PATENT DOCUMENTS

| | | | |
|---|---|---|---|
| 7,495,181 B2 | 2/2009 | Matsushita et al. | |
| 7,910,207 B2 | 3/2011 | Kamiyama et al. | |
| 8,441,422 B2 | 5/2013 | Abileah | |
| 8,668,640 B2 | 3/2014 | MacAulay et al. | |
| 10,502,971 B1* | 12/2019 | Chung | G02B 27/0018 |
| 10,579,157 B1 | 3/2020 | Wilson | |
| 2016/0247010 A1 | 8/2016 | Huang et al. | |
| 2017/0351898 A1* | 12/2017 | Zhang | G06V 10/145 |
| 2018/0025205 A1* | 1/2018 | Wu | G06V 40/1324 382/127 |
| 2018/0128973 A1 | 5/2018 | Powell et al. | |
| 2018/0373945 A1* | 12/2018 | Wu | G06V 40/70 |
| 2019/0064435 A1 | 2/2019 | Karafin et al. | |
| 2019/0391326 A1 | 12/2019 | Yang et al. | |

* cited by examiner

*Primary Examiner* — Elmito Breval
(74) *Attorney, Agent, or Firm* — Treyz Law Group, P.C.; G. Victor Treyz; Tianyi He

(57) ABSTRACT

An electronic device may have a display overlapped by an image transport layer such as a coherent fiber bundle or layer of Anderson localization material. The image transport layer may have an input surface that receives an image from the display and a corresponding output surface to which the image is transported. The input surface and output surface may have different shapes. During fabrication of the image transport layer, molding techniques, grinding and polishing techniques, and other processes may be used to deform the image transport layer and the shape of the output surface. To help reduce ambient light reflections and stray light, light-absorbing structures may be incorporated into the image transport layer and other structures overlapping the display.

6 Claims, 9 Drawing Sheets

_US 11,860,394 B1_

ELECTRONIC DEVICES WITH REDUCED STRAY LIGHT AND AMBIENT LIGHT REFLECTIONS

This application claims the benefit of provisional patent application No. 62/905,542, filed Sep. 25, 2019, which is hereby incorporated by reference herein in its entirety.

FIELD

This relates generally to electronic devices, and, more particularly, to electronic devices with displays.

BACKGROUND

Electronic devices may have displays. Displays have arrays of pixels for displaying images for a user. The shape and other characteristics of many displays can pose challenges during integration into an electronic device, particularly in situations where space is limited.

SUMMARY

An electronic device may have a display that displays an image. The image may be viewed through a display cover layer that overlaps the display.

The display cover layer may include an image transport layer such as a coherent fiber bundle or layer of Anderson localization material. The image transport layer may have an input surface that receives an image from the display and a corresponding output surface to which the image is transported. The display cover layer may also include a protective layer such as a layer of glass or other material. The protective layer may protect underlying structures such as polymer fibers or other structures in the image transport layer.

Peripheral portions of the display cover layer may have an elevated risk of reflecting ambient light. To help reduce stray light and ambient light reflections, light-absorbing material may be incorporated into the display cover layer. The light-absorbing material may be uniform across the display cover layer or may be concentrated in peripheral portions of the display cover layer (as examples).

The light-absorbing material may include dye and/or pigment. In an illustrative arrangement, filaments of light-absorbing material may be embedded within fiber cores, cladding, and/or binder and/or may be embedded within low-refractive-index areas of Anderson localization material.

DETAILED DESCRIPTION

An electronic device may have a display. The display may have an array of pixels for creating an image. The image may pass through a display cover layer that overlaps the array of pixels. To minimize display borders or to otherwise create a desired appearance for the display, the display cover layer may include an image transport layer. The image transport layer may have an input surface that receives an image from the array of pixels and a corresponding output surface to which the image is transported from the input surface. A user viewing the image transport layer will view the image from the array of pixels as being located on the output surface.

In configurations in which the input and output surfaces have different shapes, the image transport layer may be used to warp the image produced by the array of pixels. For example, the shape of the image can transformed and the effective size of the image can be changed as the image passes through the image transport layer. In some configurations, edge portions of the image are stretched outwardly to help minimize display borders.

Image transport layers can be formed from coherent fiber bundles (sometimes referred to as fiber optic plates) and/or Anderson localization material. Glass and/or polymer may be used in forming image transport layer structures. To help protect the output surface of an image transport layer, an optional transparent protective layer may be included on the outer surface of the display cover layer. This transparent protective layer may be, for example, a glass plate, or a protective layer formed from other transparent material such as clear polymer or sapphire or other crystalline materials. In some arrangements, image transport layers and/or protective layers can be formed over components other than displays.

The process of forming an image transport layer into a desired shape may affect the optical properties of the image transport layer. For example, peripheral edge portions of an image transport layer that are stretched outwardly during molding and other shaping operations may tend to reflect (scatter) light more than an unstretched central portion of an image transport layer. This can lead to an undesirable bright band around the periphery of a display as ambient light reflects off of the puerperal portion of the image transport layer. To reduce ambient light scattering and enhance the ability of a user to view image content on peripheral portions of the display, light-absorbing structures may be incorporated into the display cover layer. These structures may help absorb light and thereby suppress ambient light reflections. Light emitted from the display that scatters and forms stray light may also be absorbed by the light-absorbing structures.

Figure 1:
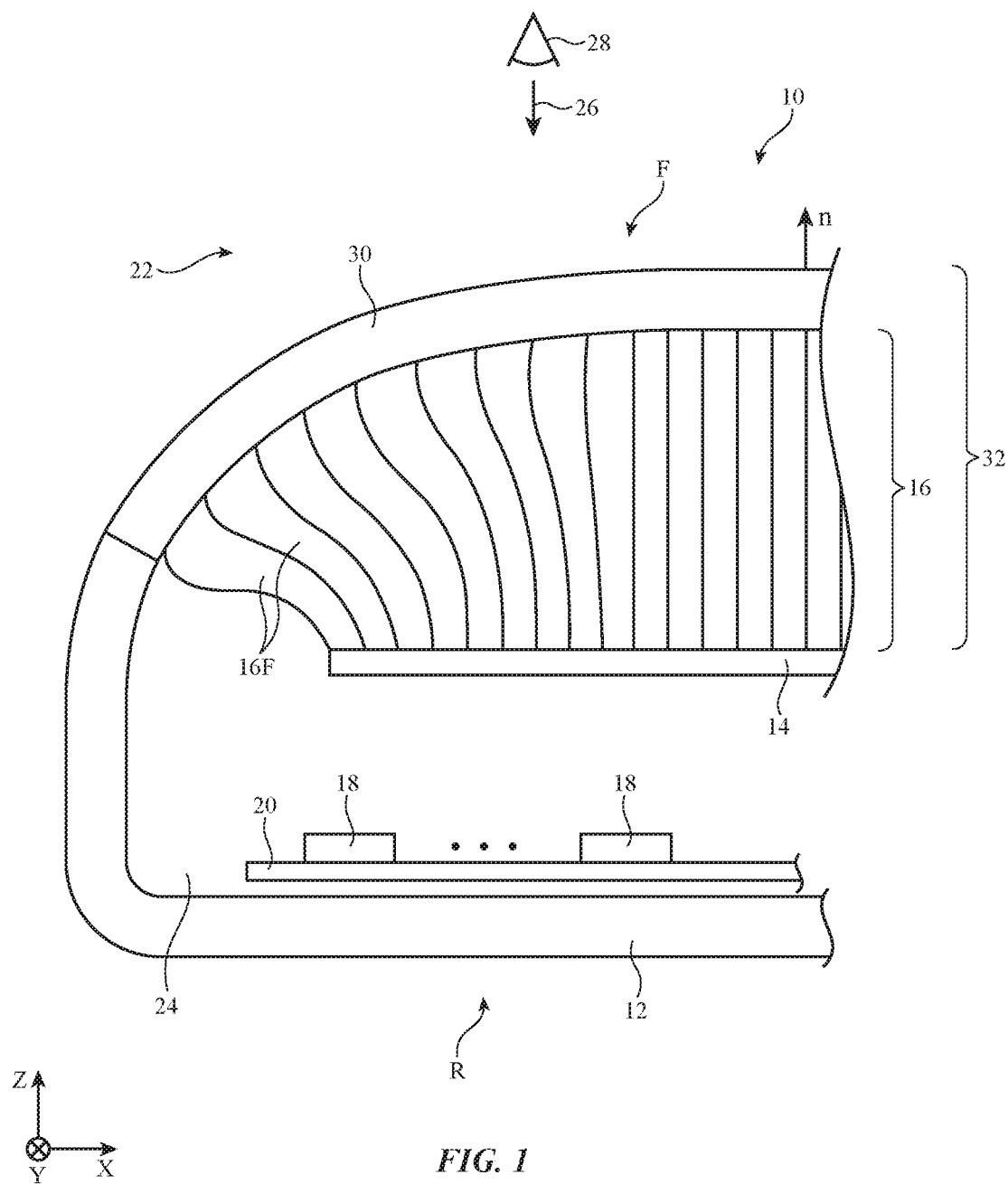
FIG. 1 is a side view of an illustrative electronic device with an image transport layer in accordance with an embodiment.

A cross-sectional side view of a portion of an illustrative electronic device with a display cover layer that includes an image transport layer is shown in FIG. 1. In the example of FIG. 1, device 10 is a portable device such as a cellular telephone, wristwatch, or tablet computer. In general, any type of electronic device may have an image transport layer such as a desktop computer, a voice-control speaker, a television or other non-portable display, a head-mounted device, an embedded system such as a system built into a vehicle or home, an electronic device accessory, and/or other electronic equipment.

Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from exterior region 22. In some configurations, an opening may be formed in housing 12 for a data port, a power port, to accommodate audio components, or to accommodate other devices. Clear housing regions may be used to form optical component windows. Dielectric housing structures may be used to form radio-transparent areas for antennas and wireless power components.

Electrical components 18 may be mounted in interior region 24. Electrical components 18 may include integrated circuits, discrete components, light-emitting components, sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, optical touch sensors, optical proximity sensors, and/or other touch sensors and/or proximity sensors, monochromatic and color ambient light sensors, image sensors, fingerprint sensors, ultrasonic sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays such as display 14. The displays may, for example, include an organic light-emitting diode display, a liquid crystal display, a display having an array of pixels formed from respective light-emitting diodes (e.g., a pixel array having pixels with crystalline light-emitting diodes formed from respective light-emitting diode dies such as micro-light-emitting diode dies), and/or other displays. The displays may include rigid display structures and/or may be flexible displays. For example, a light-emitting diode display may have a polymer substrate that is sufficiently flexible to be bent. Display 14 may have a rectangular pixel array or a pixel array of another shape for displaying images for a user and may therefore sometimes be referred to as a pixel array. Display 14 may also sometimes be referred to as a display panel, display layer, or pixel layer. Each pixel array in device 10 may be mounted under a transparent housing structure (sometimes referred to as a transparent display cover layer).

In the example of FIG. 1, display (pixel array) 14 is mounted under display cover layer 32. Display cover layer 32 (which may be considered to form a portion of the housing of device 10), covers front face F of device 10. Configurations in which opposing rear face R of device 10 and/or sidewall portions of device 10 have transparent structures covering displays and other optical components may also be used.

As shown in FIG. 1, display cover layer 32 may include image transport layer 16 and protective layer 30. Protective layer 30 may be formed from a layer of glass, clear polymer, crystalline material such as sapphire or other crystalline material, and/or other transparent material. The presence of layer 30 may help protect the outer surface of layer 16 from scratches. If desired, layer 30 may be omitted (e.g., in configurations in which a thin-film protective coating is present on the outer surface of layer 16, in configurations in which layer 16 is formed from hard material such as glass, and/or in other configurations in which layer 16 is resistant to scratching). A layer of adhesive and/or other structures may be formed between protective layer 30 and image transport layer 16 and/or may be included elsewhere in the stack of layers on display 14.

During operation, the pixels of display 14 produce image light that passes through image transport layer 16. In configurations in which image transport layer 16 is formed from a coherent fiber bundle, image transport layer 16 has optical fibers 16F. The fibers or other optical structures of image transport layer structures such as image transport layer 16 transport light (e.g., image light and/or other light) from one surface (e.g., an input surface of layer 16 that faces display 14) to another (e.g., an output surface of layer 16 that faces viewer 28, who is viewing device 10 in direction 26). As the image presented to the input surface of layer 16 is transported to the output surface of layer 16, the integrity of the image light is preserved. This allows an image produced by an array of pixels to be transferred from an input surface of a first shape at a first location to an output surface with a different shape (e.g., a shape with a footprint that differs from that of the input surface, a shape with a curved cross-sectional profile, a shape with a region of compound curvature, and/or a shape with other desired features).

Image transport layer 16 may therefore move the location of an image and may optionally change the shape of the surface on which the image is presented. In effect, viewer 28 will view the image from display 14 as if the image were generated on the output surface of image transport layer 16. In arrangements in which the image from display 14 is warped (geometrically distorted) by image transport layer 16, digital pre-distortion techniques or other compensation techniques may be used to ensure that the final image viewed on the output surface of image transport layer 16 has a desired appearance. For example, the image on display 14 may be prewarped so that this prewarped image is warped by an equal and opposite amount upon passing through layer 16. In this way, the prewarped image is effectively unwarped by passage through layer 16 will not appear distorted on the output surface.

In configurations of the type shown in FIG. 1, device 10 may have four peripheral edges and a rectangular footprint when viewed in direction 26 or may have other suitable shapes. To help minimize the size of inactive display borders as a user is viewing front face F of device 10 as shown in FIG. 1, the shapes of fibers 16F along the periphery of layer 16 may be deformed outwardly as shown in FIG. 1. These fibers 16F each have an outwardly bent segment that bends away from surface normal n of the center of layer 30 (e.g., away from an axis parallel to the Z axis of FIG. 1) and each have an inwardly bent segment that bends back towards surface normal n to help direct output light towards viewer 28.

The deformed shapes of fibers 16F (and/or the corresponding deformations made to optical filaments in Anderson localization material in layer 16) may help distribute image light laterally outwards in the X-Y plane so that the effective size of display 14 is enlarged and the image produced by display 14 covers some or all of the sidewalls of housing 12 or other peripheral portions of device 10 when the image on front face F is being viewed by viewer 28. For example, the bent shapes of fibers 16F of FIG. 1 may help shift portion of the displayed image laterally outward in the X-Y plane along the edges and corners of device 10 to block the edges of device 10 from view. In some arrangements, the portions of fibers 16F at the outermost surface of layer 16 are oriented parallel or nearly parallel with viewing direction 26 and the Z axis of FIG. 1, which helps ensure that some or all of the light that has passed through layer 16 will travel in the Z direction and be viewable by viewer 28.

Figure 2:
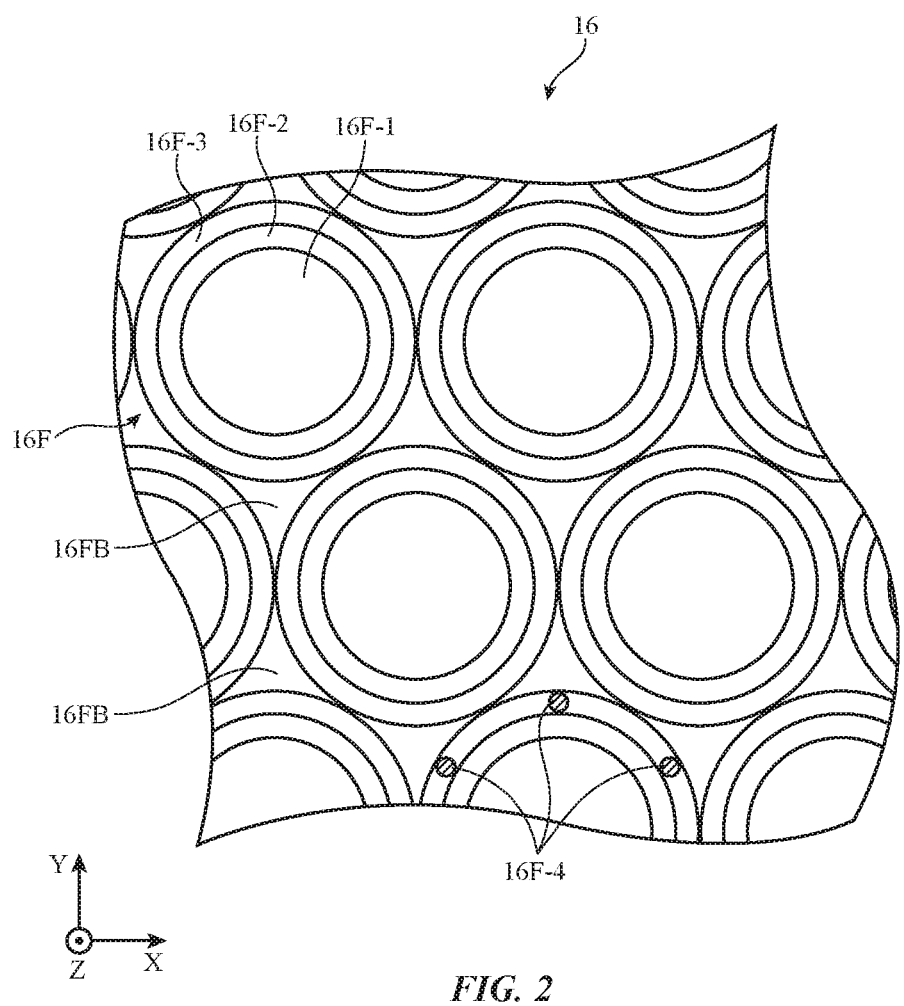
FIG. 2 is a cross-sectional view of a portion of an illustrative image transport layer formed using a coherent fiber bundle in accordance with an embodiment.

FIG. 2 is a cross-sectional view of a portion of image transport layer 16 in an illustrative configuration in which image transport layer 16 is formed from a coherent fiber bundle. Fibers 16F for layer 16 may have any suitable configuration. As shown in the example of FIG. 2, fibers 16F may each have a core such as core 16F-1. Cores 16F-1 and the other structures of image transport layer (e.g., cladding structures, binder, etc.) 16 may be formed from materials such as polymer, glass, crystalline material such as sapphire, and/or other materials. Some or all of these materials may be transparent. Arrangements in which some of the materials absorb light and/or have non-neutral colors or other light filtering properties may also be used.

Fiber cores 16F-1 may be formed from transparent material of a first refractive index and may be surrounded by cladding of a second, lower refractive index to promote light guiding in accordance with the principal of total internal reflection. In some arrangements, a single coating layer on cores 16F-1 may be used to form the cladding. In other arrangements, two or more coating layers on cores 16F-1 may be used to form the cladding. Clad fibers may be held together using binder 16FB, which serves to fill the interstitial spaces between the clad fibers. In some configurations, stray light absorbing material may be incorporated into layer 16 (e.g., into some of the cores, cladding, and/or binder). The stray light absorbing material may be, for example, polymer, glass, or other material into which light-absorbing material such as dye and/or pigment has been incorporated.

In an illustrative configuration, layer 16 may have inner coating layers 16F-2 that are formed directly on the outer surfaces of cores 16F-1 and outer coating layers 16F-3 that are formed directly on the outer surfaces of layers 16F-2. Additional coating layers (e.g., three or more coating layers) or fewer coating layers (e.g., a single coating layer) may be formed on fiber cores 16F-1, if desired. Stray light-absorbing material may be used in layers 16F-2 and/or 16F-3 or other coating layer(s) on cores 16F-1. In an illustrative arrangement, layers 16F-2 and 16F-3, which may sometimes be referred to as forming first and second cladding portions (or first and second claddings) of the claddings for fiber cores 16F-1, may respectively be formed from transparent material and stray light-absorbing material. Other arrangements may be used, if desired (e.g., arrangements in which stray light absorbing material is incorporated into some or all of binder 16FB, arrangements in which cores 16F-1 are coated with inner and outer transparent claddings and an interposed intermediate stray-light-absorbing cladding, arrangements in which cores 16F-1 are covered with a single stray-light-absorbing cladding, arrangements in which some or all of fibers 16F are provided with longitudinally extending filaments 16F-4 of stray light absorbing material located, for example, on or in any of the cladding layers, etc.).

In configuration in which fibers 16F have claddings formed from two or more separate cladding layers, the cladding layers may have the same index of refraction or the outermost layers may have lower refractive index values (as examples). Binder 16FB may have a refractive index equal to the refractive index of the cladding material or lower than the refractive index of the cladding material to promote total internal reflection (as examples). For example, each fiber core 16F-1 may have a first index of refraction and the cladding material surrounding that core may have a second index of refraction that is lower than the first index of refraction by an index difference of at least 0.05, at least 0.1, at least 0.15, at least 10%, at least 20%, less than 50%, less than 30%, or other suitable amount. The binder refractive index may be the same as that of some or all of the cladding material or may be lower than the lowest refractive index of the cladding by an index difference of at least 0.05, at least 0.1, at least 0.15, at least 10%, at least 20%, less than 50%, less than 30%, or other suitable amount.

The diameters of cores 16F-1 may be, for example, at least 5 microns, at least 7 microns, at least 8 microns, at least 9 microns, less than 40 microns, less than 17 microns, less than 14 microns, less than 11 microns, or other suitable diameter. Fibers 16F (including cores and claddings) may have diameters of at least 6 microns, at least 7 microns, at least 8 microns, at least 9 microns, less than 50 microns, less than 17 microns, less than 14 microns, less than 11 microns, or other suitable diameter.

Fibers 16F may generally extend parallel to each other in image transport layer 16 (e.g., the fibers may run next to each other along the direction of light propagation through the fiber bundle). This allows image light or other light that is presented at the input surface to layer 16 to be conveyed to the output surface of layer 16.

If desired, image transport layer 16 may be formed from Anderson localization material in addition to or instead of fibers 16F. Anderson localization material is characterized by transversely random refractive index features (higher index regions and lower index regions) of about two wavelengths in lateral size that are configured to exhibit two-dimensional transverse Anderson localization of light (e.g., the light output from the display of device 10). These refractive index variations are longitudinally invariant (e.g., along the direction of light propagation, perpendicular to the surface normal of a layer of Anderson localization material).

Figure 3:
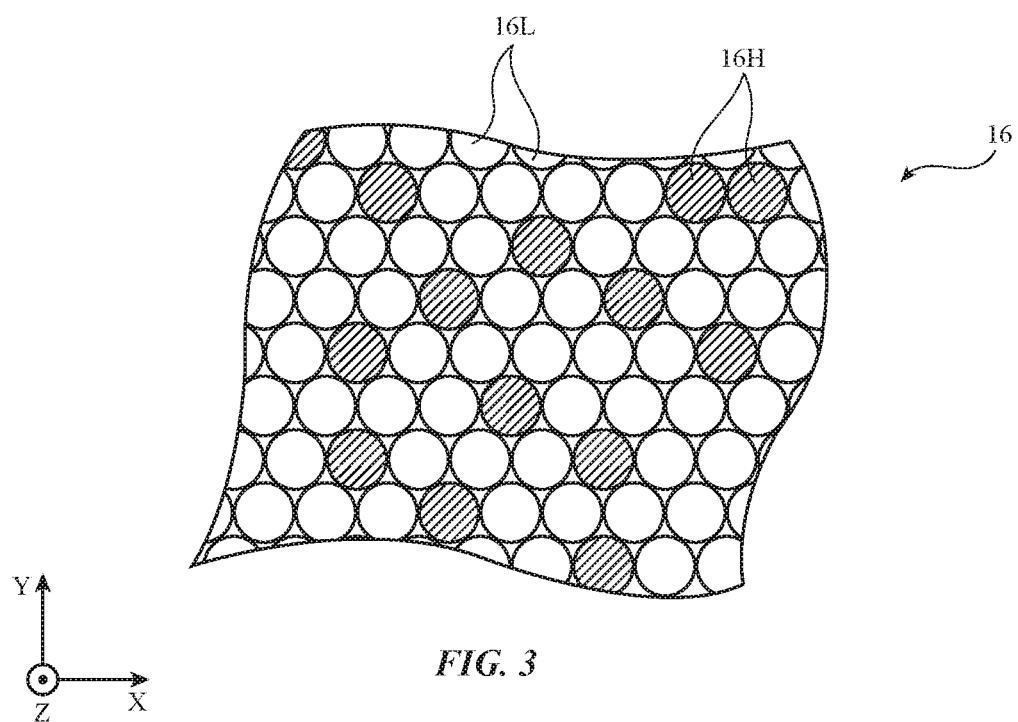
FIG. 3 is a cross-sectional view of a portion of an illustrative image transport layer formed using Anderson localization material in accordance with an embodiment.

FIG. 3 is a cross-sectional view of a portion of an image transport layer formed from Anderson localization material. In the example of FIG. 3, image transport layer 16 includes a random (pseudorandom) set of elongated optical structures of different refractive index values. These structures may, for example, be optical filaments that run into and out of the page of FIG. 3 and that have different refractive index values such as first filaments 16H with higher refractive index values and second filaments 16L with lower refractive index values. The refractive indices of filaments 16L and 16H may differ by any suitable amount (e.g., by at least 0.05, at least 0.1, at least 0.2, at least 0.3, by less than 0.8, etc.). The filaments may be distributed laterally (in dimensions X and Y) with a random pattern and may have any suitable cross-sectional shape (circular, rectangular, etc.). Anderson localization material preforms can be formed by drawing and assembling individual filaments of different refractive index values into bundles and/or can be formed by extruding lengths of material that include laterally interspersed areas of different respective refractive index values. Preforms can then be formed into layer 16 using one or more fusing and drawing operations. Other fabrication techniques may be used, if desired. To absorb stray light within an image transport layer formed from Anderson localization material, the Anderson localization material may include light absorbing material (e.g., light-absorbing filaments interspersed with transparent filaments or other light-absorbing structures).

Figure 4:
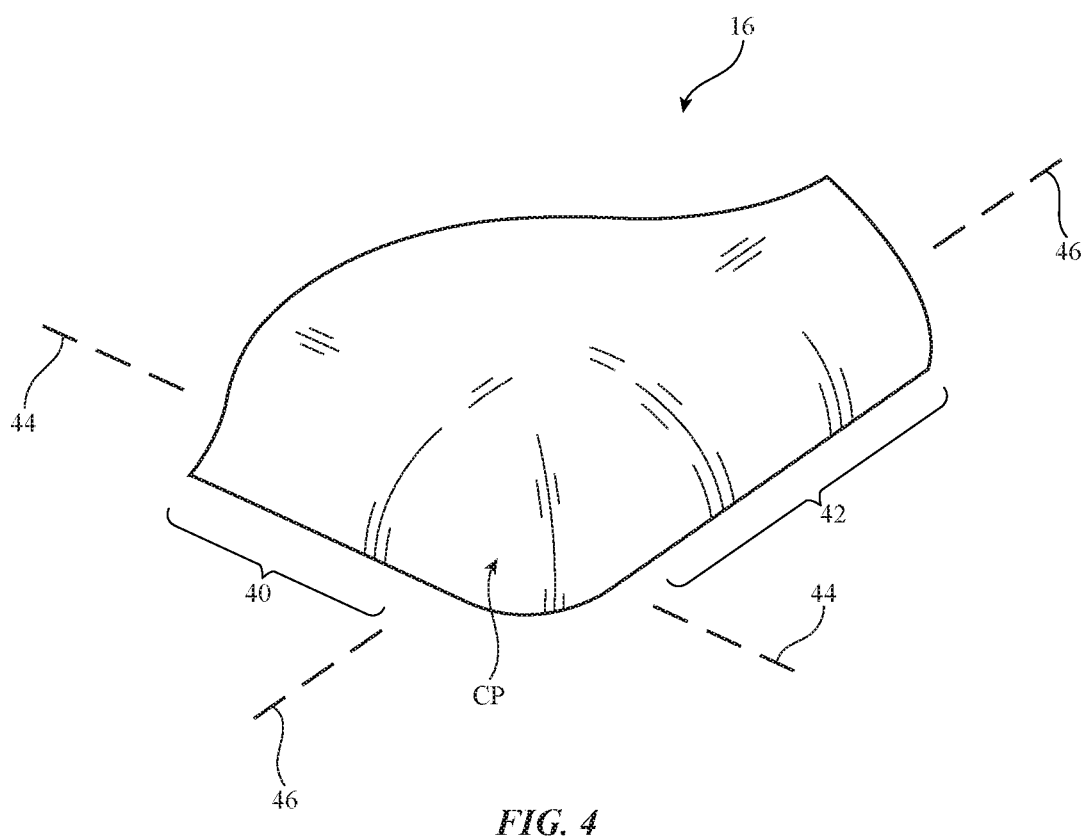
FIG. 4 is a perspective view of a portion of an image transport layer surface with compound curvature in accordance with an embodiment.

Image transport layers can be used to transport an image from a first surface (e.g., the surface of a pixel array) to a second surface (e.g., a surface in device 10 with compound curvature or other curved and/or planar surface shape) while preserving the integrity of the image. A perspective view of an illustrative corner portion of image transport layer 16 is shown in FIG. 4. In the example of FIG. 4, device 10 has edge portions 40 and 42 with surfaces that curve about axes 44 and 46, respectively. These portions of layer 16 may extend parallel to the straight sides of device 10 (as an example) and are characterized by curved surfaces that can be flattened into a plane without distortion (sometimes referred to as developable surfaces). At the corner of image transport layer 16 of FIG. 4, image transport layer 16 has curved surface portions CP with compound curvature (e.g., a surface that can only be flattened into a plane with distortion, sometimes referred to as a surface with Gaussian curvature). In a rectangular layout with curved corners, image transport layer 16 may have four corners with compound curvature. Image transport layers of other shapes (e.g., circular outlines, etc.) may also have surfaces with compound curvature (e.g., dome-shaped surfaces). When overlapped by protective layer 30, the overlapping portions of protective layer 30 may have corresponding surfaces with compound curvature. When selecting the size and shape of the output surface of layer 16 and therefore the size and shape of the image presented on the output surface, the use of an image transport layer material with compound curvature can provide design flexibility.

Figure 5:
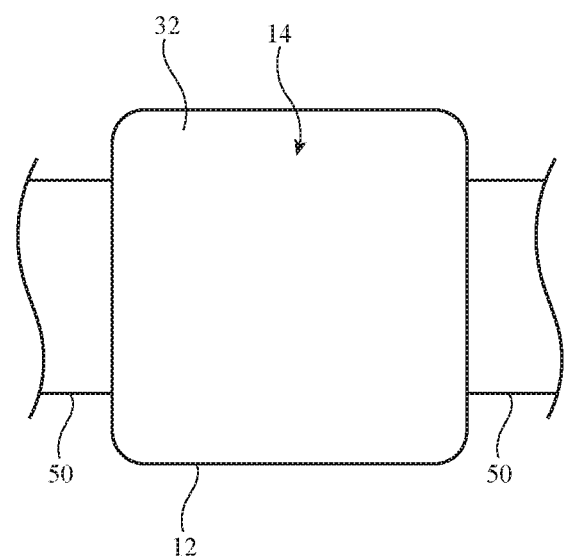
FIG. 5 is a top view of an illustrative electronic device in accordance with an embodiment.

In some arrangements, device 10 may include support structures such as wearable support structures. This allows device 10 to be worn on a body part of a user (e.g., the user's wrist, arm, head, leg, or other portion of the user's body). As an example, device 10 may include a wearable band, such as band 50 of FIG. 5. Band 50, which may sometimes be referred to as a wristband, wrist strap, or wristwatch band, may be formed from polymer, metal, fabric, leather or other natural materials, and/or other material, may have links, may stretch, may be attached to housing 12 in a fixed arrangement, may be detachably coupled to housing 12, may have a single segment or multiple segments joined by a clasp, and/or may have other features that facilitate the wearing of device 10 on a user's wrist.

Image transport layers may be formed by molding or otherwise processing blocks of image transport layer material (e.g., blocks of coherent fiber bundle material or Anderson localization material). These processing operations may include, for example, molding a block of image transport layer material in a heated mold to help create a lateral indentation in a block of image transport layer material (e.g., to create a peripheral undercut region with outwardly bent and stretched fibers as shown on the left side of layer 16 of the example of FIG. 1). The molding operation may help define optical paths through the image transport layer material that can hide inactive border structures (as an example). Additional processing (sawing, grinding, polishing, etc.) may be used to form a final desired shape for the transport layer (e.g., a shape having a peripheral portion with a downwardly curved cross-sectional profile of the type shown in FIG. 1 other suitable shape).

When image transport layer material is processed by molding (e.g., thermal stretching and expansion) and by grinding and other operations, the image transport layer material may exhibit enhanced light scattering. Increases in light scattering may occur due to small optical defects that arise during processing (e.g., stress-induced defects) and from the deformed nature of the bent optical paths in portions of the processed image transport layer. In arrangements of the type shown in FIG. 1, light scattering tends to be localized in the processed peripheral portions of image transport layer 16 (e.g., portions of layer 16 where fibers 16F are most bent and/or the output surface of layer 16 is curved). When exposed to ambient light during normal use, enhanced light scattering at the periphery of layer 16 creates a risk that the peripheral portion of the image on display 14 will be obscured by enhanced ambient light reflection (enhanced ambient light scattering from the image transport layer).

To reduce ambient light reflection and stray display light (image light that has scattered due to defects, etc.), the structures overlapping display 14 (e.g., portions of display cover layer 32) may be configured absorb light. For example, some of layer 32 may include light-absorbing structures that suppress outward light scattering resulting from ambient light illumination. FIGS. 6, 7, 8, and 9 are cross-sectional side views of portions of display cover layer 32 in illustrative configurations in which layer 32 includes structures to help suppress ambient light reflection.

Figure 6:
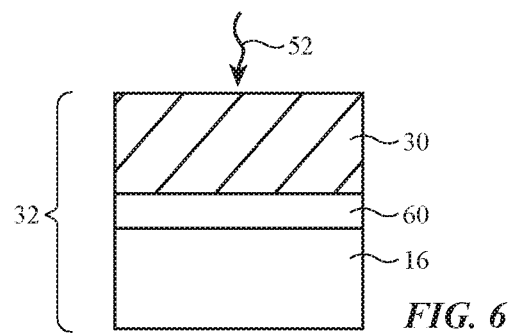
FIGS. 6, 7, 8, and 9 are cross-sectional side views of portions of illustrative display cover layers in accordance with embodiments.

In the illustrative arrangement of FIG. 6, display cover layer 32 includes image transport layer 16 and protective layer 30. A layer of adhesive such as optically clear adhesive 60 may be formed between protective layer 30 and image transport layer 16 to couple layers 30 and 16 together. To help suppress reflection of incoming ambient light, layer 30 may be provided with light-scattering material. Layer 30 may, for example, include light-absorbing material such as a dark dye, dark pigment, and/or other opaque colorant (light-absorbing colorant) that reduces the light transmission of layer 30 to a value of less than 95%, less than 90%, less than 85%, less than 80%, less than 70%, at least 50%, or other suitable amount (e.g., the light absorption of layer 30 may be 5-50%, 10-40%, 5-30%, or other suitable amount).

Incoming ambient light such as illustrative ambient light ray 52 passes through layer 30 a first time (e.g., in a downward direction when entering layer 30 from exterior region 22) and, after reflecting from light-scattering structures in layer 16, passes through layer 30 a second time (e.g., in an upward direction), before being viewed by viewer 28 (FIG. 1). Image light from display 14, however, passes through layer 30 only once (when traveling outwardly to exterior 22 from display 14). As a result, the light absorbing structures of layer 30 (and/or other light absorbing structures incorporated into layer 32) tend to absorb reflected ambient light more strongly than emitted display light. The incorporation of light-absorbing material into layer 30 therefore absorbs more reflected ambient light than image light and helps prevent the image light from being obscured by undesired ambient light reflections.

Figure 7:
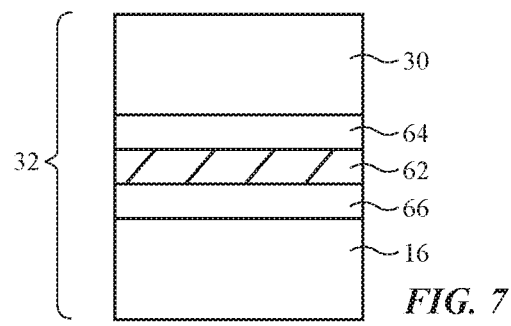

As shown in FIG. 7, a light absorbing layer such as light-absorbing layer 62 may be interposed between protective layer 30 and image transport layer 16. Adhesive layer 64 may couple protective layer 30 to layer 62 and adhesive layer 66 may couple image transport layer 16 to layer 62. Layer 62 may be a polymer film or a structure formed from other materials (e.g., glass, etc.). With an illustrative configuration, layer 62 includes light-absorbing material such as dark dye, dark pigment, and/or other opaque colorant that reduces the light transmission of layer 62 to a value of less than 95%, less than 90%, less than 85%, less than 80%, less than 70%, at least 50%, or other suitable amount (e.g., the light absorption of layer 30 may be 5-50%, 10-40%, 5-30%, or other suitable amount).

Figure 8:
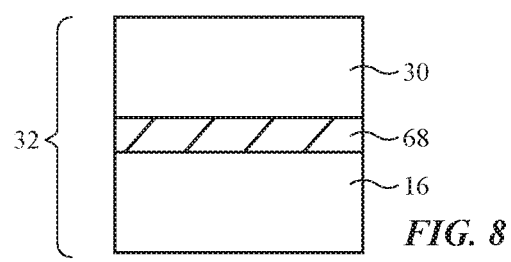

Another illustrative configuration for reducing ambient light reflections is shown in FIG. 8. In the example of FIG. 8, layer 68 between protective layer 30 and image transport layer 16 has light absorbing material. Layer 68 may be a polymer layer (e.g., a layer of cured liquid adhesive or other adhesive) that attaches layer 30 to layer 16. Layer 68 may include light-absorbing material such as dark dye, dark pigment, and/or other opaque colorant that reduces the light transmission of layer 60 to a value of less than 95%, less than 90%, less than 85%, less than 80%, less than 70%, at least 50%, or other suitable amount (e.g., the light absorption of layer 30 may be 5-50%, 10-40%, 5-30%, or other suitable amount).

Figure 9:
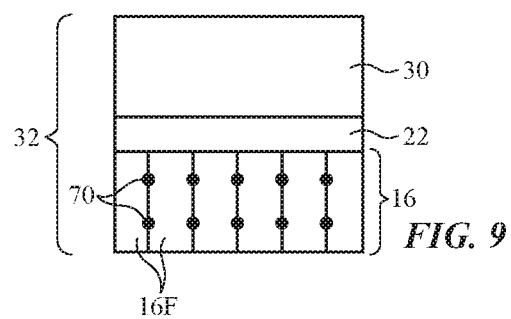

FIG. 9 shows how light-absorbing structures 70 may be incorporated into layer 16 to help reduce ambient light reflections. In the example of FIG. 9, protective layer 30 has been attached to the output surface of image transport layer 16 using adhesive layer 72. Light-absorbing material 70 (e.g., polymer, glass, or other material containing dark dye, dark pigment, and/or other opaque colorant) may be incorporated into layer 16 to help absorb ambient light. Material 70 may be incorporated into fiber cores, into fiber cladding, and/or into fiber binder in a coherent fiber bundle or may be incorporated into Anderson localization material. As described in connection with FIG. 2, light-absorbing material may be incorporated into fiber cladding (e.g., cladding 16F-2 or other cladding) to help absorb scattered light while allowing cores 16F-1 to transmit image light and/or may be provided as light-absorbing filaments 16F-4 (as examples). In general, light-absorbing material in layer 16 may be incorporated into any one or more of the structures of layer 16 and may, as an example, reduce the light transmission of layer 16 to a value of less than 95%, less than 90%, less than 85%, less than 80%, less than 70%, at least 50%, or other suitable amount (e.g., the light absorption of layer 16 may be 5-50%, 10-40%, 5-30%, or other suitable amount). Light-absorbing material(s) in layer 16 may be characterized by light absorption per unit length that is at least 2 times, at least 5 times, at least 10 times, or at least 50 times larger than the clear light-transmitting structures that form layer 16.

If desired, layer 32 may incorporate combinations of the structures of FIGS. 6, 7, 8, and/or 9. For example, layer 32 may include protective cover layer light-absorbing material as described in connection with FIG. 6, may include one or more polymer films with light-absorbing material as described in connection with layer 62 of FIG. 7, may include one or more light-absorbing adhesive layers (e.g., layers 60, 64, 66, 68, and/or 72 may include light-absorbing dye, pigment, and/or other opaque colorant as described in connection with layer 68 of FIG. 8), and/or layer 16 may include light-absorbing material as described in connection with FIG. 9. Other light-absorbing structures may be included in layer 32 if desired.

The risk of ambient light reflection may be greater in peripheral edge portions of layer 32 than in the center of layer 32. For example, layer 32 may have an undeformed central portion that is relatively free of ambient light scattering. To ensure that excessive amounts of emitted display light are not absorbed by layer 32 in portions of layer 32 with relatively small risks of ambient light reflection, different areas of layer 32 may be provide with different amounts of light-absorbing structures.

Figure 10:
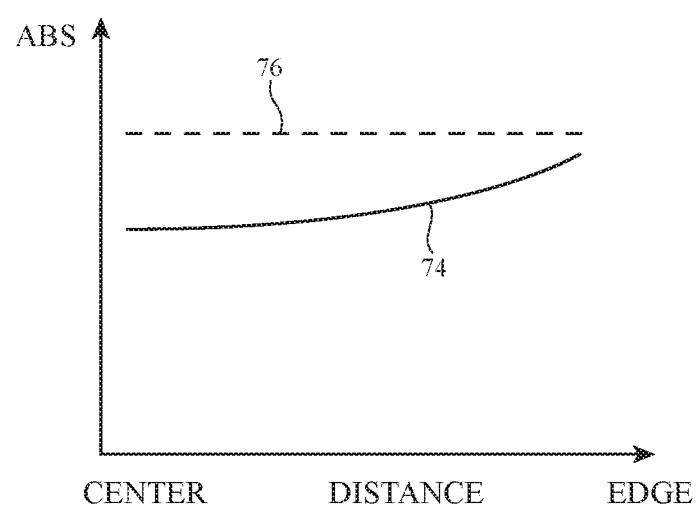
FIG. 10 is a graph showing how one or more display cover layer attributes such as light absorption can be adjusted as a function of lateral distance from the center of a display cover layer toward the periphery of the display cover layer in accordance with an embodiment.

The amount of ambient light absorption ABS that is provided in layer 32 in an illustrative configuration for layer 16 is plotted in FIG. 10 as a function of lateral distance across layer 32 (and therefore as a function of lateral distance across layer 16, display 14, and device 10). As shown by curve 76 in the graph of FIG. 10, layer 32 may, for example, be provided with one or more of the light-absorbing structures of FIGS. 6, 7, 8, and/or 9 in an arrangement that leads to a laterally varying amount of ambient light reflection suppression. Curve 76 shows how layer 32 may exhibit increasing amounts of ambient light reflection suppression at increasing lateral distances across layer 32 (e.g., at increasing lateral distances from the center of layer 32 towards the peripheral edge of layer 32). As a result, the peripheral portion of layer 32, which include more light-absorbing structures, will tend to suppress ambient light reflection more than the central portion of layer 32. If desired, the peripheral portion of layer 32 may suppress ambient light reflection less than the center of layer 32 or, as shown by curve 76, light absorption and ambient light reflection suppression may be uniform across layer 32 (as examples).

Figure 11:
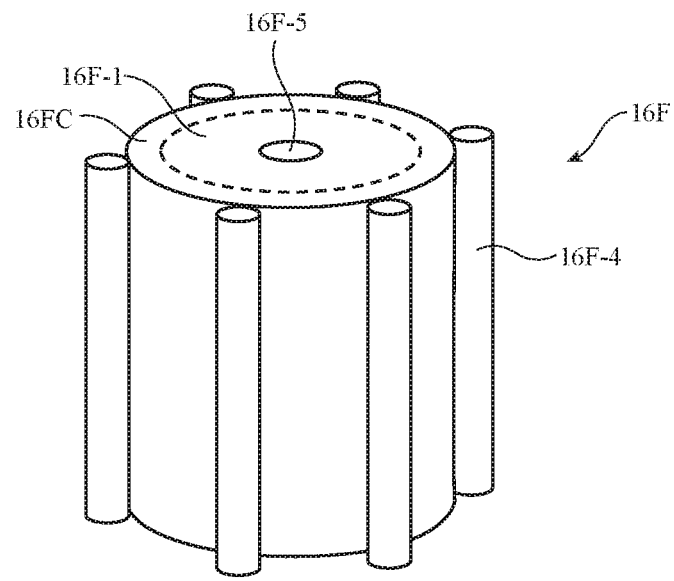
FIG. 11 is a perspective view of a fiber with illustrative light absorption structures in accordance with an embodiment.
Figure 12:
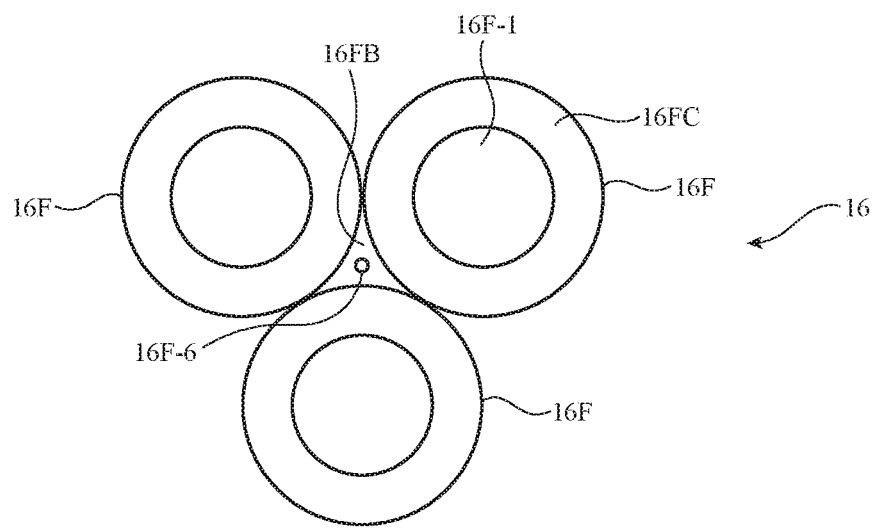
FIG. 12 is a cross-sectional view of illustrative fibers in an image transport layer having a light absorption structure located within binder in accordance with an embodiment.

FIG. 11 is a perspective view of an illustrative fiber in image transport layer 16. As shown in FIG. 11, light absorbing structures such as longitudinally extending light-absorbing filaments 16F-4 (e.g., filaments of polymer or glass that include dye, pigment, and/or other opaque colorant such as black or gray filaments) may be used to absorb light. One or more such light-absorbing filaments may be embedded within cladding 16FC of fiber 16F, may be adjacent to cladding 16FC or, as illustrated by light-absorbing filament 16F-5, may be incorporated within fiber core 16F-1. FIG. 12 shows how one or more light-absorbing filaments (e.g., illustrative light-absorbing filament 16F-6) may be formed within binder 16FB. The intensity of guided light is higher in fiber core 16F-1 and is lower in binder 16FB, so embedding light-absorbing material such as filament 16F-6 within binder 16FB helps preferentially absorb stray light (e.g., so that absorption of display image light being guided between the input and output surfaces of layer 16 may be maintained at acceptable levels). The diameter of the cores of fibers 16F may have any suitable value (e.g., 5-15 microns, 10 microns, etc.). The cladding of fibers 16F may be 1 micron in thickness, at least 0.5 microns, less than 2 microns, or other suitable cladding thickness). The diameter of filaments 16F-4 and/or 16F-5, and/or 16F-6 may be 0.1 microns to 0.5 microns, at least 0.05 microns, less than 1 micron, or other suitable value). The refractive index of filament 16F-5 may be matched to or lower than the refractive index of surrounding core material, the refractive index of filaments 16F-4 may be matched to or lower than the refractive index of surrounding cladding material (and/or binder), and the refractive index of filaments 16F-6 may be matched to (or lower than) the refractive index of binder 16FB (as examples).

Figure 13:
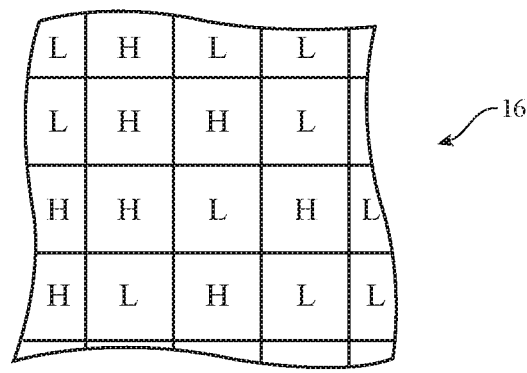
FIG. 13 is a cross-sectional view of illustrative Anderson localization material in accordance with an embodiment.

If desired, image transport layer 16 may be formed from Anderson localization material. In an illustrative configuration, the Anderson localization material for layer 16 may have a cross-sectional structure of the type shown in FIG. 13. As shown in FIG. 13, layer 16 may, as an example, have areas of with a first refractive index (H) interspersed randomly with areas with a second refractive index (L) that is lower than the first refractive index. These areas may be associated, respectively, with filaments of the first and second refractive index values. The difference in refractive index between the first and second areas may be at least 0.02, at least 0.5, at least 0.1, at least 0.2, at least 0.3, at least 0.4, or other suitable value. The filaments may have lateral dimensions of about two wavelengths in size or other suitable size. In the arrangement of FIG. 13, the H and L filaments have been formed using an extrusion process (followed by one or more drawing operations to thin the filaments and one or more fusing operations to build up the lateral size of layer 16). The cross-sectional shape of the filaments of the Anderson localization material may be rectangular (e.g., square) or may have other suitable shapes.

Figure 14:
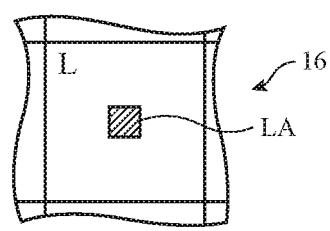
FIG. 14 is a cross-sectional side view of an area of lowered refractive index that has been provided with a light absorption structure to absorb light in Anderson localization material such as the Anderson localization material of FIG. 13 in accordance with an embodiment.

During the process of guiding light between the input and output surface of layer 16, the guided light tends to be concentrated within the filaments of higher refractive index (e.g., the H filaments of FIG. 13). To help preferentially absorb stray light, the light-absorbing structures added to layer 16 may, if desired, be formed as elongated filaments embedded within the lower-refractive index regions of a layer of Anderson localization material. As shown in FIG. 14, for example, light-absorbing filament LA (sometimes referred to as a subfilament) or may be formed within an L filament (filament of the second refractive index) in the Anderson localization material of layer 16 and may be completely surrounded by material of the second refractive index. Some or all of the L filaments in layer 16 of FIG. 13 may include light-absorbing filaments such as filament LA of FIG. 14. For example, in areas in which it is desired to have a higher amount of light absorption, there may be a larger density of filaments LA. The refractive index of filament LA may be matched to or lower than the refractive index of surrounding filament L.

Figure 15:
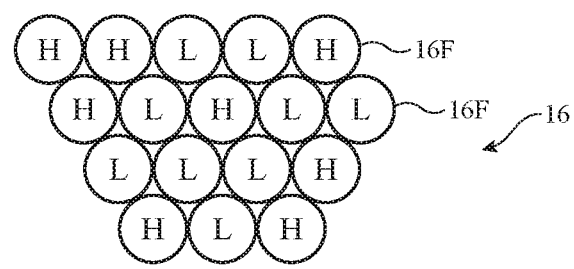
FIG. 15 is a cross-sectional view of illustrative Anderson localization material with filaments of different refractive index in accordance with an embodiment.
Figure 16:
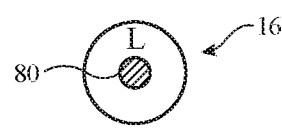
FIG. 16 is a cross-sectional side view of a filament of lowered refractive index that has been provided with a light absorption structure to absorb light in Anderson localization material such as the Anderson localization material of FIG. 15 in accordance with an embodiment.

In the example of FIG. 15, layer 16 has been formed from Anderson localization material with interspersed filaments (e.g., filaments of circular cross-sectional shape or other suitable shapes). Layer 16 of FIG. 15 may, as an example, be formed by joining a bundle of filaments (followed by one or more optional drawing operations to reduce the lateral dimensions of the filaments and one or more optional fusing operations to build up the lateral size of the image transport layer). The H filaments may have a first refractive index and the L filaments may have a second refractive index that is less than the first refractive index. In layer 16, the L and H filaments may have diameters of about two wavelengths or other suitable diameters. As shown in FIG. 16, some or all of the L filaments may include light-absorbing filaments (sometimes referred to as subfilaments) such as subfilament 80. Filaments 80 may be embedded within and completely surrounded by low-index material (e.g., material of the second refractive index). The refractive index of each filament 80 may be matched to (the same as) or lower than the refractive index of surrounding filament L.

Light-absorbing filaments in Anderson localization material such as filaments LA of FIG. 14 and filament 80 of FIG. 16 that are surrounded by the material of the second refractive index may occupy 5-50%, 5-25%, less than 25%, or other suitable fraction of the total area within of the surrounding filament boundary (as an example). For example, if filament L of FIG. 16 has a total filament area of A (e.g., without filament 80 being present), then filament 80 may have an area of 5-50% of A, less than 40% of A, less than 30% of A, or less than 25% of A. The diameter of filaments LA and 80 may be, as an example, 0.1 microns to 0.5 microns, at least 0.05 microns, less than 1 micron, less than 2 microns, or other suitable size.

The incorporation of light-absorbing filaments into the filaments of lower refractive index in Anderson localization material may help absorb stray light and, as described in connection with FIG. 9 may help reduce ambient light reflections.

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device, comprising:
a display configured to produce an image; and
an image transport layer that overlaps the display, wherein the image transport layer is configured to receive the image at an input surface and to transport the received image to an output surface, wherein the image transport layer includes first areas of a first refractive index and second areas of a second refractive index that is lower than the first refractive index, wherein the image transport layer comprises light-absorbing filaments in the second areas, wherein the image transport layer comprises Anderson localization material, wherein the first areas correspond to first filaments of the first refractive index, wherein the second areas correspond to second filaments of the second refractive index, and wherein the light-absorbing filaments are embedded within the second filaments.

2. The electronic device defined in claim 1 wherein the light-absorbing filaments have a third refractive index that is no greater than the second refractive index.

3. An electronic device, comprising:
a display configured to produce an image; and
an image transport layer that overlaps the display, wherein the image transport layer is configured to receive the image at an input surface and to transport the received image to an output surface, wherein the image transport layer includes first areas of a first refractive index and second areas of a second refractive index that is lower than the first refractive index, wherein the image transport layer comprises light-absorbing filaments in the second areas, wherein the image transport layer comprises a coherent fiber bundle having fiber cores, fiber cladding, and binder, and wherein the first areas correspond to the fiber cores and wherein the second areas correspond to the fiber cladding.

4. The electronic device defined in claim 3 wherein the light-absorbing filaments have a third refractive index that is no greater than the second refractive index.

5. An electronic device, comprising:
a display configured to produce an image; and
an image transport layer that overlaps the display, wherein the image transport layer is configured to receive the image at an input surface and to transport the received image to an output surface, wherein the image transport layer includes first areas of a first refractive index and second areas of a second refractive index that is lower than the first refractive index, wherein the image transport layer comprises light-absorbing filaments in the second areas, wherein the image transport layer comprises a coherent fiber bundle having fiber cores, fiber cladding, and binder, and wherein the first areas correspond to the fiber cores and wherein the second areas correspond to the binder.

6. The electronic device defined in claim 5 wherein the light-absorbing filaments have a third refractive index that is no greater than the second refractive index.

* * * * *